United States Patent [19]
Bouyoucos et al.

[11] Patent Number: 4,753,316
[45] Date of Patent: Jun. 28, 1988

[54] SEISMIC SOURCE

[75] Inventors: John V. Bouyoucos, Pittsford; Roger L. Selsam, Rochester, both of N.Y.

[73] Assignee: Hydroacoustics Inc., Rochester, N.Y.

[21] Appl. No.: 879,241

[22] Filed: Jun. 26, 1986

[51] Int. Cl.⁴ .................... G01V 1/04; H04K 1/02
[52] U.S. Cl. .................... 181/120; 181/115; 367/146
[58] Field of Search ............... 181/115, 117, 118, 119, 181/120; 367/143, 144, 145, 146

[56] References Cited

U.S. PATENT DOCUMENTS

| | | | |
|---|---|---|---|
| 3,601,216 | 8/1971 | Mott-Smith | 181/115 |
| 3,746,123 | 7/1973 | Huffhines | 181/115 |
| 4,131,178 | 12/1978 | Bouyoucos | 367/146 |
| 4,185,714 | 1/1980 | Pascouet | 367/146 |
| 4,196,788 | 4/1980 | Sciard | 181/120 |
| 4,234,052 | 11/1980 | Chelminski | 367/146 |
| 4,303,141 | 12/1981 | Pascouet | 181/120 |
| 4,346,779 | 8/1982 | Manin | 367/146 X |
| 4,632,217 | 12/1986 | Bouyoucos | 181/120 |

FOREIGN PATENT DOCUMENTS 0152099 8/1985 European Pat. Off. ............ 367/144
2153532 8/1985 United Kingdom .

OTHER PUBLICATIONS

Seismic Systems Brochure, *Hydropneumatic Water Guns*, Seismic Systems, Inc., 1983.

Newman, Watergun Fills Seismic Gap, Oil & Gas Journal, 8/7/78, pp. 138-150.

Primary Examiner—Deborah L. Kyle
Assistant Examiner—Brian Steinberger
Attorney, Agent, or Firm—M. LuKacher

[57] ABSTRACT

A water gun seismic source for use in underwater environments has a sleeve valve (100) for opening a jet aperture (37, 101) to enable jets of pressurized water to be emitted for the generation of a seismic signal. The water is pressurized by a drive piston (3) which is reciprocated to a cocked position for pressurizing the water for the jets. A compressed air operated cocking mechanism (4, 7, 8, 76 or 110-199 or 200-260) is coupled to the piston for cocking it. The cocking mechanism may utilize cocking piston (7) slideable on a shaft (4) connected to the drive piston (3) which cocking piston is returned to a position where any load due to such cocking piston is decoupled from the shaft. The sleeve valve (100) may be biased to close the jet aperture ports (101) by compressed air and opened with high timing resolution when the pressurized water held back by the sleeve valve is applied to actuate it (via 40, 41, 50 & 43). Compressed air may be released in the vicinity of the jet aperture ports to be entrained with the jets and assist in forming the vapor cavities which collapse to produce the seismic signal. When compressed air is used to help nucleate the vapor cavities it may also be applied, instead of the pressurized water, to the seat of the sleeve valve to actuate the sleeve valve and open the jet aperture ports.

28 Claims, 5 Drawing Sheets

SEISMIC SOURCE

The present invention relates to seismic sources for use in underwater environments, and particularly to an improved water gun seismic source.

The present invention is especially suitable for use for seismic exploration in underwater environments. The invention may also be useful in the generation of acoustic signals in other applications, such as underwater signaling and detection.

Water gun seismic sources which are improved by the present invention are described in U.S. Pat. No. 4,131,178 issued to John V. Bouyoucos on Dec. 26, 1978 and U.S. patent application Ser. No. 129,871 filed by John V. Bouyoucos on Mar. 13, 1980, now U.S. Pat. No. 4,632,214, issued Dec. 30, 1986. In water gun seismic sources as described in the above-referenced patent and patent application, high pressure water jets in the form of free jet columns are abruptly terminated to generate vapor cavities underwater whose collapse generates a seismic signal. The water guns described in the above-referenced patent and patent application are actuated entirely by hydraulic means using pressurized liquid. More particularly, pressurized water is used to cock a drive piston against a compressible gas spring, storing energy in the spring and pressurizing the water in a chamber which can communicate with the underwater environment through jet aperture ports. The water gun is fired by actuating a valve to open the jet aperture ports so as to emit the water jets into the underwater environment.

Oftentimes the water gun is towed by a seismic exploration ship which is equipped principally with high volume air compressors, rather than hydraulic pumps. It is then desirable to use such air compressors to provide compressed air for actuating the drive piston and cocking the gun. Air cocking arrangements have been proposed (see U.S. Pat. Nos. 4,185,714 issued Jan. 29, 1980; 4,196,788 issued Apr. 8, 1980, and 4,303,141, issued Dec. 1, 1981, and also UK patent application No. GB2153532A published 21 Aug. 1985). Such schemes have been complex in design and have burdened the drive piston with massive loads, much larger than in the case of the hydraulic cocking arrangements described in the above-referenced Bouyoucos patent and patent application, thereby reducing the velocity of the jets and the strength of the seismic signal.

Operation of the water guns in deep or stagnant water may result in seismic signals of lower energy than in shallow water. It is desirable to improve operation of water guns under conditions which lead to reduction of signal energy.

It is a feature of this invention to provide a simplified and readily implementable water gun which may be cocked by compressed air or another compressed gas wherein the cocking mechanism is separate from the firing mechanism as provided by a valve in porting relationship with the apertures through which the water jets are emitted.

It is another feature of the present invention to provide an improved valve mechanism which may be used either with a compressed air or gas operated arrangement or with a hydraulically operated arrangement for cocking the water gun, which valve mechanism provides high resolution timing in the firing of the gun (i.e., in opening the jet aperture thereof). More specifically, the invention provides for an improved water gun having an improved valving mechanism which controls the issuance of the water jet therefrom with high timing resolution.

It is a still further feature of the invention to provide an improved water gun which automatically resets itself to cocked position for the next firing.

It is still another feature of the invention to provide a jet driving piston which can be cocked either by pressurized water or compressed air or another gas.

It is a still further feature of the present invention to provide an improved water gun having an arrangement for cocking the jet driving piston in a manner which does not add excessive load and mass to the piston, and avoids causing a reduction in the velocity of the jets.

It is a still further feature of the invention to provide an improved water gun capable of actuation by compressed air or another gas which utilizes the energy of the compressed air or gas, efficiently.

It is a still further feature of the invention to provide an improved water gun which has facilities for counteracting conditions, such as may occur during operation at deep submergence, which can reduce the energy of the seismic signal generated by the gun.

Briefly described, a water gun seismic source in accordance with the invention is adapted to emit jets of water in underwater environments to generate seismic signals. The gun has a housing with at least one jet aperture extending into a chamber in the housing in which pressurized liquid is confined by a drive piston and a valve in porting relationship with the jet aperture. In one embodiment, the drive piston is actuated by air or another compressed gas for moving the piston into cocked position in one direction so as to develop in the chamber a pressure greater than the pressure of the underwater environment. The drive piston may be connected via a shaft which is movable therewith, to a cocking piston. The cocking piston is slideable on the shaft and moves into engagement with a collar fixed to the shaft when the drive piston is moved to the cocked position. Valve means are associated with the cocking piston for moving it in the direction to cock the gun and then returning it in the opposite direction so that it is out of the way of and does not load or add mass to the dynamic system consisting of the driving piston and its shaft. The velocity of the drive piston is therefore not reduced by virtue of the cocking mechanism.

The valve which ports the jet aperture is desirably a sleeve valve which is biased by compressed air or another compressed gas into a position where it closes and seals the jet aperture. When the jet apertures are closed by the valve, and when the drive piston is cocked against the air spring, the pressure in the chamber is elevated. To fire the gun, the pressurized water in the chamber is switched to an actuating surface of the sleeve valve, preferably the surface thereof which engages the surface of a seat for sealing the aperture. The pressurized water overcomes the bias and rapidly, with high timing resolution, actuates the valve and opens the jet aperture to emit the jet. The jet aperture is effectively in porting relationship with the drive piston which terminates the jet when it reaches a stop or when the drive piston itself blocks the jet aperture.

It has been discovered in accordance with the invention that the tensile strength of the water affects the formation of the vapor cavities and therefore the energy of the seismic signal when the cavities collapse. The presence of nucleation sites (nuclei) in the water jets affects its tensile strength. Sufficient populations of such sites may not exist at significant depths (25 meters or more below the surface, for example) or in stagnant water. Compressed air released into the jet apertures or in their vicinity may be provided to create the needed nuclei. The compressed air may also be applied to actuate the sleeve valve, thereby providing dual functions.

The foregoing and other objects features and advantages of the invention, as well as the presently preferred embodiments thereof, will become more apparent from a reading of the following description in connection with the accompanying drawings in which.

Referring more particularly to FIGS. 1, 2, 3 and 4 there is shown an improved water gun which can be operated as a 'pure' water gun, i.e., actuated wholly with water as the operative fluid, or as a hybrid water gun in which both compressed air and water are operative fluids. Compressed air actuation, as noted above, provides additional versatility which enables the seismic exploration vessels having large installed air capacity (compressors) to use such compressors without having to add hydraulic pumps or to change their umbilicals which connect the gun to the vessel.

The gun shown in the drawings utilizes a cylindrical housing 1 having a bore 1A in which is located a drive piston 3 separating a water filled chamber 2 from a gas filled (suitably with compressed air) region 5. The region 5 is initially precharged to a certain pressure through a connector (not shown) and then the drive piston 3 is retracted from the position shown at 23 and 25 in FIG. 1 by the dash lines to the position shown in full in FIG. 1, where the rear end 41 of the shaft 4 meets the stop provided by the face 43 of the end 45 of the housing 1. The drive piston 3 is fixedly attached to the forward end 46 of the shaft 4 by a nut 47 which clamps the drive piston against a flange 49 of the shaft 4. Bearings 51 around the outer periphery of the drive piston 3 and bearings 53 in a connection section 54 of the housing 1 guide the drive piston and maintain it and its shaft 4 coaxial with the bore 1A of the housing 1 which contains the chamber 2 and region 5. Bearings 51 and 53 may typically be made of a tough, low friction plastic material such as Teflon or urethane, and are associated with an O-ring like sealing member.

Figures 1, 1A:
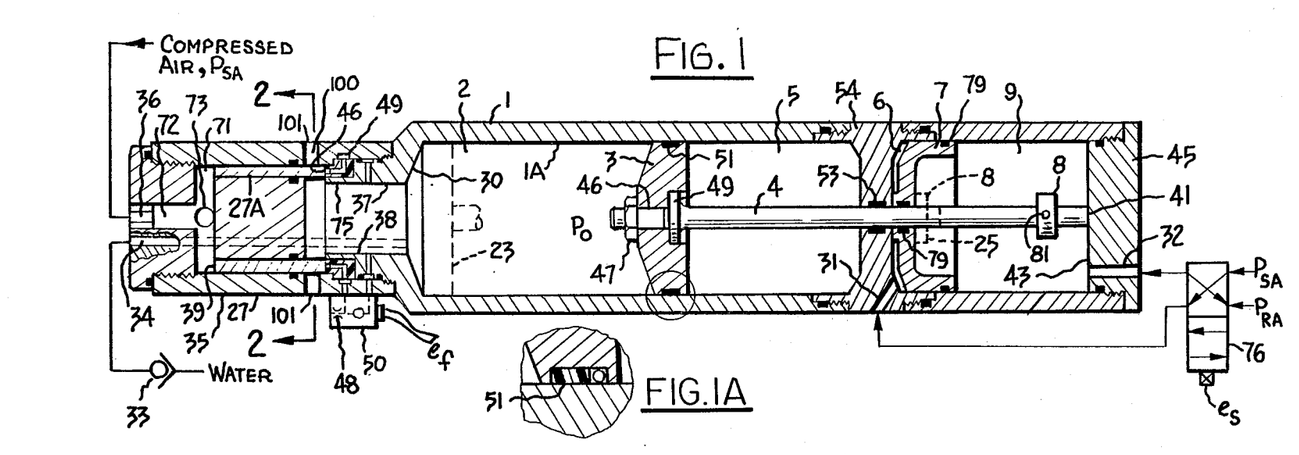
FIG. 1 is a transverse sectional view (the section being taken along the line 1—1 in FIG. 2) of a water gun seismic source embodying the invention.
FIG. 1A is an enlargement of the area in the vicinity of element 51 of FIG. 1.
Figure 2:
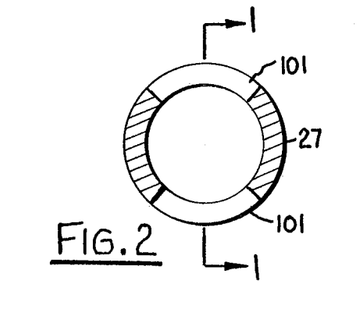
FIG. 2 is a sectional view of the source shown in FIG. 1 taken through the jet aperture ports thereof and along the line 2—2 in FIG. 1.

The bore 1A has a smaller diameter section 37 connected to the remainder of the bore 1A by a conically tapered surface 30 which provides a seat for the drive piston 3. The lower section 27 of the housing 1 has an annular recess (a tubular groove) 27A containing a cylindrical sleeve valve 100. Intersecting the recess or groove are two diametrically opposed jet aperture ports 101 which communicate the chamber 2 and the surrounding underwater environment. The ports 101 together with the aperture section provided by the bore section 37 form the jet aperture of the gun. The sleeve valve 100 is in porting relationship with the jet aperture. The forward end 39 of the sleeve valve presents an actuating surface to a cavity 71 provided by the lower end of the annular recess (tubular groove) 27A which contains the sleeve valve 100. An axial passage 72 and radial passages 73 communicate with an inlet 36 for compressed air at a controlled pressure to the cavity 71.

Air pressure $P_{SA}$ is always less than the water pressure $P_o$ in chamber 2 when the gun is cocked. The pressure of the compressed air against the surface 39 biases the sleeve valve rearwardly to bring a sealing surface 75 at the rear end of the valve 100 against the seating surface 46 of an annular seating member 38. Upon opening of the sleeve valve 100, the ports 101 are opened and pressurized water in the chamber 2 is forced, by the compressed air backed driving piston 3, out of the gun at high velocity. The piston 3 is also in porting relationship with the jet aperture, since when it reaches the seat 30 it effectively closes off aperture section 37 and the ports 101 and the jets emitted from the jet aperture ports 101 are abruptly terminated. Free jet columns are provided and a cavitation void evolves in the underwater environment at or near each outlet aperture 101. The collapse of these voids is associated with the production of the seismic signal generated by the gun.

Figure 3:
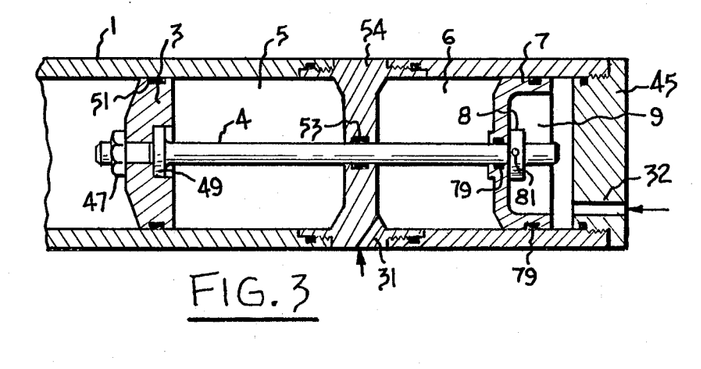
FIG. 3 is a fragmentary view showing the drive piston and cocking mechanism of the source illustrated in FIGS. 1 and 2 in cocked position.

With the piston 3 all the way forward as shown at 23, the cocking sequence can commence. A four-way valve 76 is actuated by an electrical signal ($e_s$) to allow compressed air at relatively high or supply pressure ($P_{SA}$) into a cavity 6 via passage 31. Cavity 6 is the forward one of two variable volume cavities 6 and 9 defined by a cocking piston 7 which is slideably mounted on bearings 79 in the bore of the housing on the rear side of a connector 54. The shaft has a collar 8 fixed thereto by a pin 81. The other cavity 9 is connected to compressed air at relatively low or return pressure ($P_{RA}$) or the ambient through the valve 76. The cocking piston is then forced rearwardly to pick up the collar 8 and to move the drive piston 3 and shaft 4 to the cocked position as shown in FIG. 3.

As the drive piston 3 moves rearwardly, water is drawn into the chamber 2 through a check valve 33 and an inlet line 34. With the sleeve valve 100 closed, the piston 3 is captured at the back of its stroke by the check valve 33.

The position of the valve 76 is then reversed and the cocking piston 7 is returned to its rest position as shown in FIG. 1. The air in the region 5 is compressed and the pressure exerted by the compressed air pressurizes the water in the chamber 2. The gun is then cocked and ready for firing. In the event of a misfire before completion of the cocking action, the shear pin 81 on the collar 8 yields before the cocking piston is accelerated. Major damage to the gun upon misfiring is thus avoided.

The firing of the gun occurs when the sleeve valve 100 is actuated. The valve and the portion of the housing associated therewith is shown more clearly in FIG. 4 and FIG. 4A. In its closed position, the sealing surface 75 of the valve is forced against the seating surface 46 of the seating member 38. The magnitude of the air pressure exerted against the actuating surface 39 of the valve 100 is well below the pressure of the water in the chamber 2 when the gun is cocked, but it is sufficiently high to force the sleeve valve 100 into sealing relationship with the seating member 38.

Figure 4:
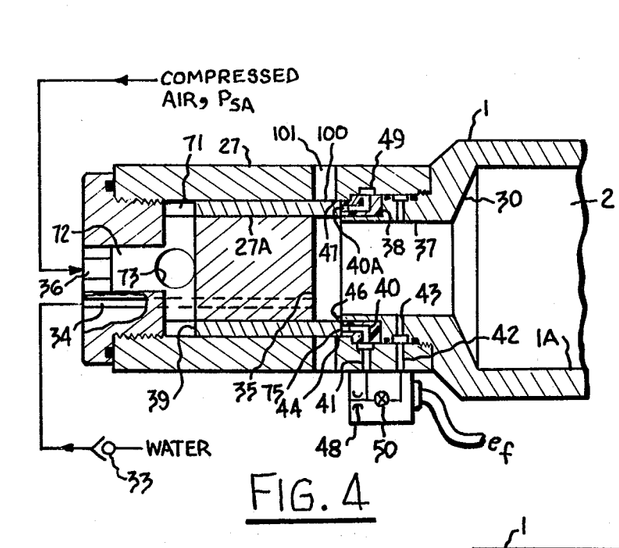
FIG. 4 is an enlarged fragmentary view of the end of the water gun source illustrated in FIGS. 1, 2 and 3 which contains the jet aperture section and the sleeve valve for opening the apertures.

The seating member 38 has a series of holes 40 spaced from each other by equal arcs. Holes spaced approximately 30° apart will be suitable. These holes extend through the sealing surface 46 and extend radially to a circumferential groove 39 which, in turn, is connected by a line 41 to a solenoid valve 50 operated by a firing signal $e_f$. The holes 40 are also connected to the surrounding ambient (the underwater environment) through an orifice restriction 48 so that when the valve 50 is closed, the holes 40 are maintained at the ambient pressure of the underwater environment and the sleeve valve's sealing surface 75 can seat firmly against the seating surface 46 of the seating member 38 in the presence of high water pressure in the chamber 2. To augment effective sealing of the sealing surface 75 of the valve 100 with sealing surface 46, a circumferential undercut 40A in sealing surface 46 may be used which can insure that the ambient pressure in holes 40, as above described, is distributed uniformly around the central region of the sealing surface 46. Then, the valve closing force arising from the air pressure $P_{SA}$ in cavity 71 acting on the full forward face 39 of valve 100 can be greater than the residual valve opening force consisting of the pressure $P_O$ acting on the region of surface 75 from the inner diameter of the valve to the edge of the undercut 40A, even though $P_{SA}$ is considerably less than $P_O$.

When the solenoid valve 50 is opened, the high pressure water of pressure $P_O$ in the chamber 2 is communicated through the passages 43, the passage 42, the solenoid valve 50, the passage 41, the groove 49, the holes 40 and the undercut 40A to act against the entire sealing surface 75 of the sleeve valve 100. Since $P_O$ is considerably larger than $P_{SA}$, the opening force on the sleeve valve 100 is then considerably greater than the closing force exerted by the air pressure in, the cavity 71 against the actuating face 39 of the sleeve valve 100. The sleeve valve, upon firing, is driven abruptly open and the high pressure water in the chamber 2, driven by the piston 3, issues through the jet aperture consisting of aperture section 37 and ports 101 to form opposed jets.

It is preferable that the jet apertures extend circumferentially only about fifty percent of the total circumference of the housing. Therefore, over approximately fifty percent of the sealing surface 75 of the valve 100, the pressure will be approximately equal to the pressure in the chamber 2. The air pressure $P_{SA}$ in the cavity 71 which works against the actuating surface 39 of the valve 100, is also set low enough so that the resulting force on the sealing surface 75 of the valve due to the water pressure in the chamber 2 exceeds the valve closing force due to the air pressure on the actuating surface 39. The sleeve valve 100 then remains open until the piston 3 closes the jet aperture by moving into seating relationship with the conical seat 30. Then the pressure in the chamber 2 drops back to the ambient pressure of the surrounding underwater environment. The air pressure in the cavity 71 acting on the actuating face 39 of the valve 100 returns it to its forward, sealing position.

The seating member 38 is preferably an annular plastic member which is captured by a step 47 in the lower cylindrical housing section 27 so as not to be blown out of its seat when the solenoid valve 50 is opened. There is also a slight overlap 44 of the sleeve valve 100 and the housing section 27 which assists to enable the pressure across the sealing surface 75 of the valve to rise abruptly as the solenoid valve 50 is opened. This initiates rapid acceleration of the sleeve valve 100 to its open position. The arrangement is such that high timing resolution of firing is obtained. Consequently the timing resolution of the seismic signal is also high.

Figure 5:
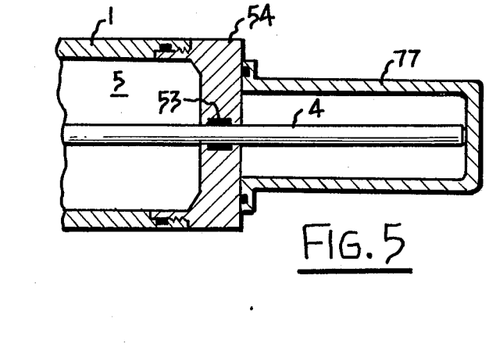
FIG. 5 is a fragmentary sectional view illustrating the end of the water gun source opposite from the end shown in FIG. 4 in accordance with an embodiment wherein the gun is cocked using pressurized water rather than compressed air.

The water gun shown in FIGS. 1 through 4 is operable either as a water actuated or compressed air actuated device. To make the gun water actuated, the inlets 31 and 32 to the variable volume regions may be closed off and the cocking piston 7 is left in its rest position as shown in FIG. 1. A source of high pressure water is connected to the inlet side of the check valve 33. Compressed air is still fed to the compressed air inlet 36 but is used only for pressurizing the cavity 71 and no significant airflow is required. As shown in FIG. 5 the rear portion of the housing 1 behind the coupling member 54 can, if so desired, be removed and a protective cover 77 for the shaft end 4 provided, when the gun is water actuated for cocking.

When the gun shown in FIGS. 1 through 4 is air actuated for cocking, the cocking piston 7 is returned to its rest position prior to firing. Since the cocking piston 7 is slideably mounted on the shaft 4, it is decoupled from the dynamic system of the drive piston during firing. The mass of the cocking piston is not carried. The moving dynamic system has low mass and can move at high velocity.

The velocity of the jets is also enhanced because of the area transformation between the cross-sectional area of the piston 3 and the area of the jet aperture. The diameter and hence the area of the piston 3 is greater than the area of the bore in the aperture section of the chamber 37 or the area of the jet ports 101. The smaller diameter of the aperture section 37 has the advantage of enabling the diameter of the sleeve valve 100 to be smaller than the diameter of piston 3, thereby reducing the mass of the valve and increasing its speed of operation. Also, as a result of the area transformation, the velocity of piston 3 will be a fraction of the velocity of the fluid in chamber 37 or jet ports 101. This has a benefit in enhancing the reliability of the water gun since the seals on the piston 3 will move more slowly and wear less. Because of the area transformation ratio, the equivalent mass of the piston in the dynamic circuit which is in effect when the piston 3 drives the water jets is reduced. The net effect of this reduction is the efficient transfer of energy from the energy stored in the region 5 to the kinetic energy of the jets.

When the water jets are abruptly terminated, tensile stresses in the jet streams cause rupture of the liquid, and the growth of vapor cavities. The ultimate collapse of these cavities leads to the impulse signature of the gun (the seismic signal). The tensile strength of pure, degassed water is generally of the order of several hundred atmospheres. However, in most practical fluids nuclei are present in the form of small, undissolved air bubbles or air entrained in the surface cracks of particulate matter in the liquid. These sites of undissolved air create weak points in the liquid and significantly reduce its tensile strength. However, such nuclei may not exist in stagnant water or at significant depths in water bodies.

Since any increase in the tensile strength of the liquid within and surrounding a water gun can lead to a reduction in the energy output of the gun, it has been found, in accordance with the invention, that it is important that where a sufficient population of natural nuclei are not present, such be artificially introduced. It is most practical for purposes of consistent energy output to introduce such nuclei directly in the jet stream. This can be done by introducing controlled amounts of compressed air into the jets as they issue from the gun. This can be accomplished by having compressed air feed a nozzle to meter air bubbles into the jet aperture region just outward of the sleeve valve. Alternatively, compressed air can be used to trigger the gun with the resultant release of air bubbles in the stream creating the required nuclei.

Figure 4A:
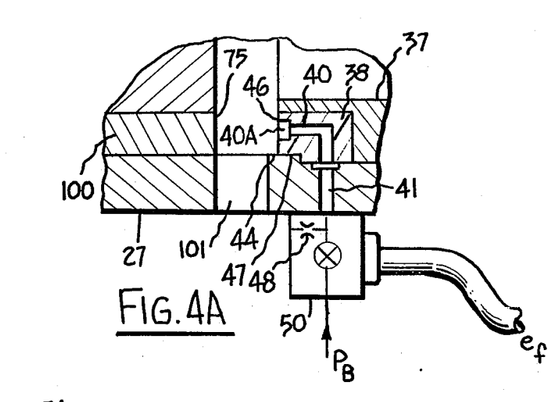
FIG. 4A is a fragmentary sectional view of the area in the vicinity of the jet aperture ports showing means in accordance with another embodiment of the invention, applying compressed air into the ports to assist in formation of the vapor cavities, the collapse of which produces the seismic signal, and also to activate the valve which opens the ports.

As shown in FIG. 4A, the solenoid valve 50 switches compressed air at pressure $P_B$, which is higher than $P_{SA}$, through the passages 41 and 40 to the undercut 40A in the seating surface 46. This air $P_B$ actuates sleeve valve 100 and opens the jet aperture ports 101, and also supplies the source of air bubbles. These bubbles form the nuclei which reduces the tensile strength of the ambient water.

Figure 6:
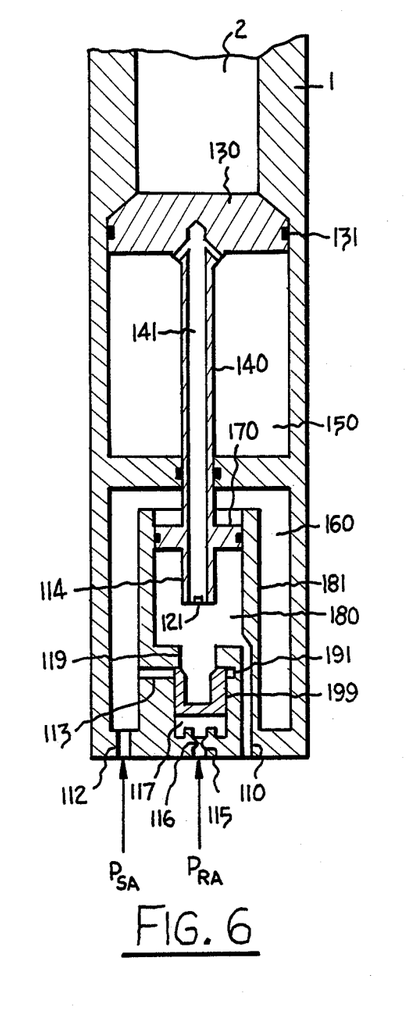
FIGS. 6 and 7 are sectional views similar to the views shown in FIGS. 1 and 3 showing a compressed air cocking mechanism in accordance with another embodiment of the invention.
Figure 7:
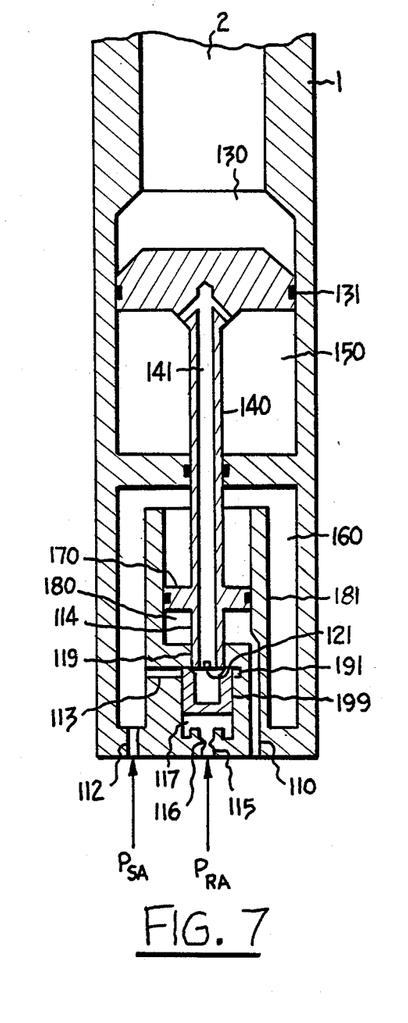

Referring to FIGS. 6 and 7, there is shown a mechanism for cocking the water gun in two positions; the first, as shown in FIG. 6 prior to cocking and the second, shown in FIG. 7 when cocked. The drive piston 130 has a shaft 140 with an axial passage 141 therethrough. The passage communicates with the region 150 in the housing 1. The housing also contains the high pressure water chamber 2. There is provided at the lower end of the housing a cup shaped valve 199 which is chamfered inwardly along its open end. When the drive piston 130 and its shaft 140 are in the position shown in FIG. 6, the valve 199 is in its closed position. The valve 199 is forced into its closed position by a controlled leakage path around the valve 199 that, in conjunction with an orifice 116 which is connected to the return side of the compressed air source at the lower pressure ($P_{RA}$) through a passage 115, maintains the pressure in the cavity 117 between the bottom of the valve 199 and the rear end of the housing 1 intermediate between supply pressure (the higher compressed air pressure $P_{SA}$) and ambient pressure in the underwater environment. A coaxial inner section 181 has a bore in which a cocking piston 170 attached to the shaft 140 reciprocates and defines a chamber 180. The chamber 180 is kept near ambient pressure by a large exhaust passage 110. Both passages 110 and 115 exhaust to the source of return pressure ($P_{RA}$) or to the ambient.

A cavity 160 within the inner section 181 and around chamber 180 is maintained near supply pressure $P_{SA}$ by a passage 112 which is directly connected to the compressor supply air hose. The area of the cocking piston 170 is much smaller than the area of the drive piston 130. Since the pressure across the main seal 131 of the drive piston is low, the area of the cocking piston 170 need only be ten percent to thirty percent of that of the main piston 130.

During cocking, air exhausts through the central passage 141 of the piston shaft 140 from the region 150 in back of the drive piston 130 into the central cavity 180, and thence to ambient or return through the passage 110. As the piston approaches fully cocked position, the end 114 of the piston shaft enters the bore 119 above the valve 199 and seals the passageway 141 from the cavity 180. Further motion forces the valve 199 off its seat on the underside of a circumferential groove 191 which forms a gallery and allows high pressure air from supply, $P_{SA}$, which passes through the radial passage 113 to enter the region between the end 114 of the shaft 140 and the valve 199. The high pressure air causes the valve 199 to open further and to remain open during the charging portion of the cycle.

The end 114 of the piston shaft 140 is castellated with radial slots 121. These slots 121 allow high pressure air to enter the region interior of the valve 199. This high pressure air passes through the passageway 141 into the region 150 behind the drive piston and applies force against the drive piston to pressurize the water in the jet chamber 2. The piston 130 is captured because of the action of the one-way check valve 33 which allows water to enter the jet chamber 2 but does not allow the water to escape, since the valve 100 is closed prior to firing (see FIG. 1). The dimensions of the shaft 140 and the length of the bores in which the shaft and the valve 199 travel are long enough to provide sufficient overtravel to seal the end 114 of the shaft 140 to allow for some leakage and compression of water from the jet cavities 2 during the portion of the cycle when the region 150 is charged with high pressure air.

Sufficient time is allowed after cocking and before the sleeve valve 100 is actuated to open the jet aperture for the pressure in the region 150 to approach supply pressure ($P_{SA}$). The gun is fired when the drive piston 130 is cocked and is in the position shown in FIG. 7. When the gun fires, the drive piston and its shaft move upwardly, driving the pressurized water through the jet apertures at high velocity. Then the pressurized air in the region 150 forces the drive piston upwardly and the valve 199 moves back (resets) to the position shown in FIG. 6. If necessary a mechanical spring can be used to aid in resetting the valve 199. It will be observed that the recocking of the drive piston occurs automatically after the gun is fired. The pressure is maintained in the air supply hoses. The system is efficient in the use of the air since the air hoses are not charged or discharged during the cycle of operations.

Figure 8:
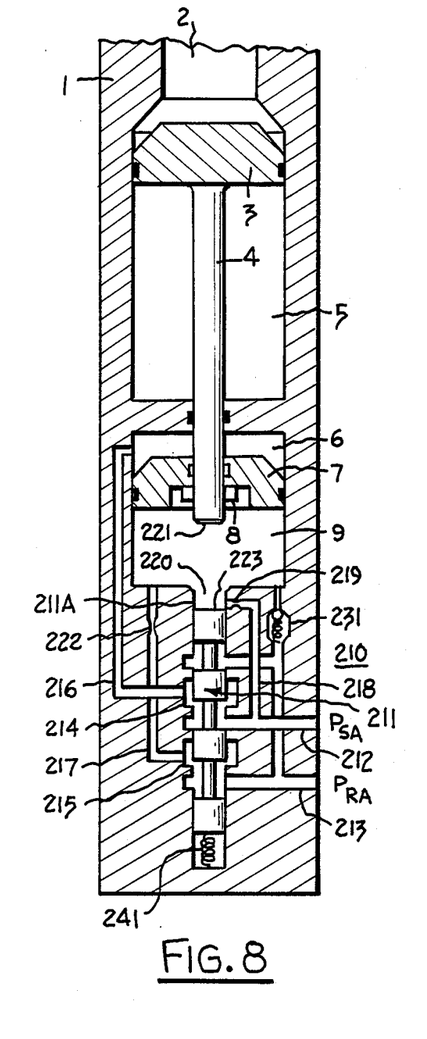
FIGS. 8, 9, 10 and 11 are transverse sectional views similar to FIGS. 1 and 3 showing a compressed air cocking mechanism in accordance with still another embodiment of the invention in different positions during a cycle of operation thereof.
Figure 9:
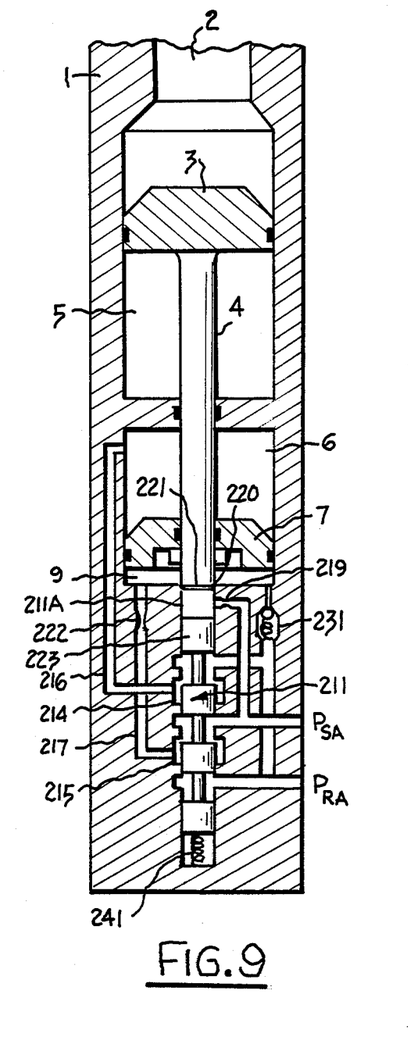
Figure 10:
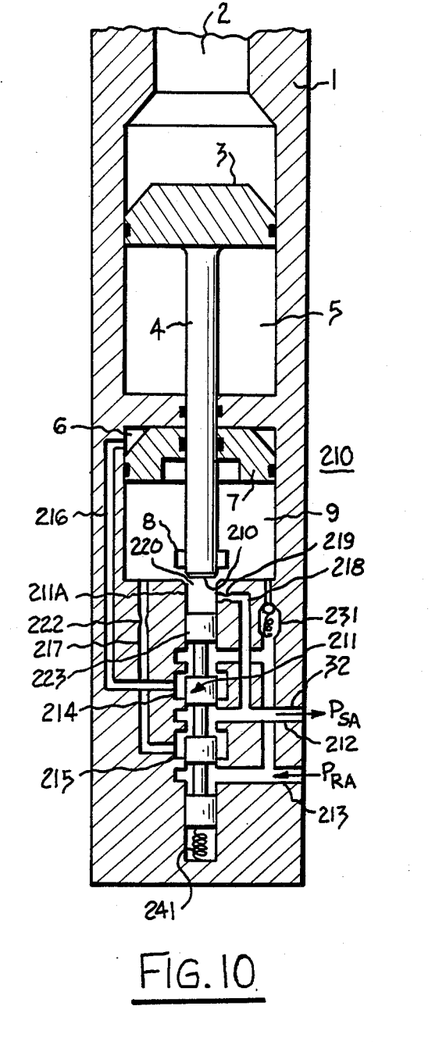
Figure 11:
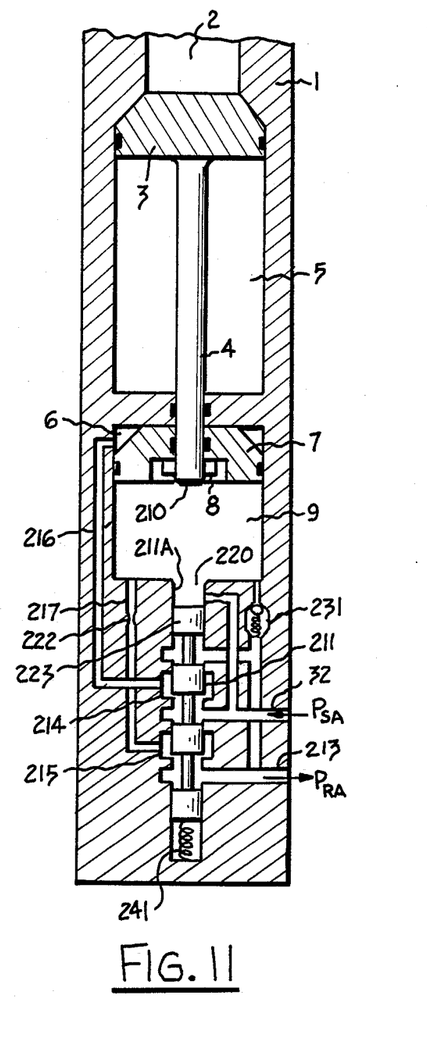

Referring to FIGS. 8, 9, 10 and 11 there is shown a mechanism for cocking the drive piston 3 of the water gun source in accordance with another embodiment of the invention. Parts which are like those shown in FIGS. 1 through 4 are indicated with like reference numerals. FIGS. 8 and 9 show the position of the parts of the mechanism during cocking. FIG. 10 shows the position of the parts where the gun is cocked and the cocking piston 7 has returned to its rest position. FIG. 11 shows the position of the parts of the cocking mechanism after the gun has been fired.

The cocking mechanism 210 uses a four-way spool valve 211 located in a bore 211A. Inlet and outlet passages 212 and 213 at supply pressure ($P_{SA}$) and return pressure ($P_{RA}$) are connected to the bore 211A spaced on opposite sides of one of the lands of the spool 211. Outlet ports 214 and 215 from the spool valve are connected through passages 216 and 217 to the variable volume regions 6 and 9 on opposite sides of the cocking piston 7. The cavity 6 operates as a cocking cavity and the other cavity 9 operates as a reset cavity. An auxiliary line 218 connects the compressed air inlet 212 with the top of the bore above the upper end 223 of the spool of the valve 211. This line 218 has a restriction 219. The top of the bore above the spool end 223 is in communication with the reset cavity 9 through an opening 220 which is concentric with the rear or lower end 221 of the shaft 4 of the drive piston 3. When the shaft end 221 is driven downwardly against the opening 220 (see FIG. 9), the opening 220 is sealed from the reset cavity 9. To facilitate such sealing, the end 221 of the shaft 4 and the end of the opening 220 may be chamfered to provide a sealing seat.

A restriction 222 in the reset cavity 9 feed line 217 limits the rate at which compressed air is fed into the reset cavity 9 from the outlet port 215. A spring-loaded check valve 231 connects the reset cavity 9 and the outlet port 213 (i.e., to the return line at $P_{RA}$). The spring-loaded check valve 231 acts as a pressure reducing valve to keep the air pressure in the reset cavity 9 below a preset limit.

Following firing of the gun, the spool of the valve 211 is biased upwardly by a spring 241. The valve is therefore normally displaced upward to the position shown in FIG. 8. Then, supply pressure is fed through the valve and the line 216 to the cocking cavity 6. The reset cavity 9 is connected via the line 217 and the outlet port 215 to the return line 213 (at $P_{RA}$). When the gun and valve 210 are in the position shown in FIG. 8, the pressure in the cocking cavity 6 builds up toward supply pressure and exerts a cocking force on the cocking piston 7. The piston 7 engages the collar 8 and drives the shaft 4 and the drive piston 3 into the region 5, compressing the air therein and storing energy. The piston 3 comes to a stop when the end 221 of the shaft 4 seats at the entrance opening to the valve bore 211A. At this point in the cycle the drive piston is cocked as shown in FIG. 9.

The cocking piston 7 is returned to its rest position automatically when the gun is in the position shown in FIG. 9. This is because the upper end of the bore 211A is sealed by the end 221 of the shaft 4. Then, air from the supply port 212 at high pressure enters the cavity formed between the spool end 223 and the shaft end 221 through the restriction 219 of the line 218. Pressure builds up in this cavity and applies a downward force which overcomes the bias force of the spring 241, pushing the valve spool 211 downwardly. As the valve spool moves downward, compressed air at supply pressure ($P_{SA}$) is connected by way of the port 215 and the line 217 to the reset cavity 9. Return pressure ($_{RA}$) is connected via the port 214 and the line 216 to the cocking cavity 6. Consequently, the cocking piston 7 is driven in the return direction to its rest position as shown in FIG. 10. The only resistance to motion of the cocking piston in the return direction is provided by the seals of the cocking piston 7. Therefore, the pressure differential across the piston 7 does not have to be very large to return it and the power dissipated in effecting this return motion will be insignificant. The restriction 222 in the line 217 restricts airflow into the reset cavity 9 to minimize the power dissipating in effecting the return motion of the cocking piston 7.

When the gun is fired by opening the sleeve valve 100 (FIGS. 1 and 4), the drive piston 3 is driven by the compressed air in the region 5 forwardly to its seat 30, expelling water at high velocity out of the jet apertures 101. Immediately, as the end 221 of the shaft 4 leaves its sealing relationship with the end 220 of the spool valve bore, the pressure at the top of the spool 211, which has been high due to the connection of the line 218 to the supply line at ($P_{SA}$), falls to the ambient pressure in the return cavity 9. This pressure has been maintained low enough by the spring-loaded check valve 231, so that when the cocking piston is returned to its rest position, the air pressure in the reset cavity is not high enough to maintain the spool 211 of the four-way valve 210 in its downward position against the spring 241. The spool 211 then moves upwardly in its bore 211A under the force of the spring 241 to return the spool 211 from the position shown in FIG. 10 to the position shown in FIG. 11. In the latter position, compressed air is fed from the inlet 212 through the valve port 214 to line 216 and thence to the recocking cavity 6. Concurrently the reset cavity 9 is connected via line 217 and port 215 to the return line 213. Force is then applied to the reset piston to recock the gun, as shown in the sequence commencing in FIG. 8. Recocking therefore occurs automatically and without the need for operator assistance.

From the foregoing description, it will be apparent that there has been provided an improved water gun seismic source. Several presently preferred embodiments of the invention have been described. Variations and modifications in such embodiments, within the scope of the invention, will undoubtedly suggest themselves to those skilled in the art. The area of the cocking piston could be slightly greater than the annular area of piston 3; allowing them to be fed from the same pressure source. Accordingly, the foregoing description should be taken as illustrative and not in a limiting sense.

We claim:

1. A water gun seismic source for emitting jets of water into an underwater environment to generate seismic signals comprising a housing having a jet aperture with at least one jet aperture port, means defining a chamber in said housing in which said jet aperture port is located and for providing pressurized water in said chamber, a movable valve disposed in porting relationship with said jet aperture port and having an actuating surface and a sealing surface which face in opposite directions, said housing being provided with a seating surface on which said sealing surface seats to close the jet aperture port, means for applying a relatively constant pressure against said actuating surface to develop a force for moving said valve sealing surface against said seating surface to close said aperture port, and means communicating with said seating surface for applying upon command a pressure to said sealing surface for developing a force thereon greater than the force applied against said actuating surface for moving said valve away from said seating surface for opening said jet aperture port whereby to emit a jet of water.

2. The source according to claim 1 wherein the pressurized water providing means comprises a reciprocal drive piston which separates said chamber and a region in said housing for containing compressible fluid, means for moving said piston towards said region when said jet aperture port is closed and for providing compressed fluid in said region thereby to pressure the water in said chamber and to cock said water gun, said piston being movable in a direction away from said region under the pressure of the compressed fluid therein into porting relationship with said jet aperture, after said valve opens said jet aperture port, to close said aperture port to terminate the jet.

3. The source according to claim 2 wherein said housing has a bore in which said drive piston is reciprocally mounted, said bore defining said chamber and having a section of smaller diameter in which said jet aperture is disposed, said bore having a section of larger diameter spaced in the direction of said region from said section of smaller diameter and in which said piston is reciprocal, said bore section of small diameter defining a passage for higher velocity of flow of water through said jet aperture than the velocity of flow in said bore section of larger diameter when said jet aperture opens.

4. The source according to claim 2 wherein said means for moving said drive piston comprises a shaft connected to and reciprocal with said drive piston, a cocking piston mounted on said shaft and defining variable volume chambers on opposite sides of said cocking piston, and valve means for controlling the flow of pressurized fluid with respect to at least one of said variable volume chambers in said region for cocking said drive piston.

5. The source according to claim 4 wherein said shaft has a fixedly mounted collar thereon, said cocking piston being slideably mounted on said shaft between said collar and said drive piston and engageable with said collar, said valve means being operable to firstly switch in one sense the flow of said fluid with respect to said variable volume chambers for applying pressure on said cocking piston for moving said cocking piston into engagement with said collar and moving said shaft and drive piston in the direction of said region into cocked position, and secondly switching the flow of said fluid with respect to said variable volume chambers in the sense opposite to said first sense to move said cocking piston away from said collar to a rest position and to enable said drive piston to move independently of said cocking piston, relieved of the mass of said cocking piston, when the jet aperture porting valve is opened to emit the jet.

6. The source according to claim 5 wherein said housing has a compartment spaced from said chamber and said region into which said shaft extends and in which said cocking piston is reciprocal, said cocking piston dividing said compartment into said variable volume chambers, said collar and said drive piston being mounted adjacent opposite ends of said shaft, and said collar also being disposed on said shaft in said one of said variable volume chambers.

7. The source according to claim 6 wherein said valve means is in communication with both of said variable volume regions for switching the flow of said fluid with respect thereto.

8. The source according to claim 6 wherein said fluid which is switched with respect to said variable volume regions is air or another compressible gas.

9. The source according to claim 8 wherein said valve means is a four-way valve having a spool movable in a bore, said bore including a cavity in communication with said compartment, said shaft having an extension movable into and out of sealing relationship with said cavity, connections for said fluid at relatively high and relatively low pressure to said spool valve bore and outlet ports from said spool valve bore communicating with said variable volume chambers of said compartment, means for biasing said spool in one direction toward said cavity, the high pressure one of said connections being in communication with said cavity for developing pressure against said spool when said sealing relationship exists to move said spool in a direction opposite to said one direction to switch the outlet ports of said four-way valve with respect to said connections for moving said cocking piston to said rest position, and, when said sealing relationship does not exist, to move said spool in said one direction to switch the outlet ports of said four-way valve with respect to said connections for moving said cocking piston with said shaft and said drive piston into a cocked position.

10. The source according to claim 9 further comprising a relief valve communicating the one of said variable volume chambers of said compartment which is in communication with said spool and cavity with the one of said connections at relatively low pressure.

11. The source according to claim 4 wherein said shaft has a passage therethrough communicating with said region, an inlet for air or another compressible gas at relatively high pressure into one of said variable volume chambers, an inlet for said air or other gas at relatively low pressure into the other of said chambers, and a valve element engageable with said shaft when it moves toward said region to bring said drive piston into cocked position for communicating said high pressure inlet and said passage for charging said region with said air or other compressible gas at said high pressure.

12. The source according to claim 2 further comprising means for admitting pressurized water into said chamber when said valve is seated against the seating surface of said housing and said port is closed for moving said piston towards said region into cocked position and compressing the fluid in said region.

13. The source according to claim 1 wherein said communicating means comprises means for communicating the pressurized water in said chamber through said seating surface upon said command for developing said greater force.

14. The source according to claim 1 wherein said communicating means comprises means for communicating pressurized air or gas through said seating surface at a pressure sufficient to develop said force greater than the force applied against said actuating surface.

15. A water gun seismic source for emitting jets of water in an underwater environment to generate seismic signals comprising a housing having a bore extending axially of said housing, a jet aperture in said housing extending transversely of the axis of said housing into said bore, a drive piston axially movable in opposite directions in an enlarged portion of said bore and dividing said enlarged portion of said bore into first and second chambers on opposite sides of said drive piston, said second chamber being a region in said housing for containing compressible fluid, said jet aperture extending into said first chamber, a sleeve valve around said bore in porting relationship with said jet aperture, means communicating water from the underwater environment into said first chamber while said jet aperture is closed, means for moving said piston into cocked position in one of said opposite directions to increase the volume of said first chamber and fill said first chamber with water, said water being under pressure greater than the pressure of said underwater environment when said piston is cocked, means for moving said sleeve valve to release said piston for movement in the other of said opposite directions to drive said water through said jet aperture and emit a jet of water to produce the seismic signal, means operated by compressed air or another compressed gas for applying force to said sleeve valve at one end thereof to maintain said sleeve valve normally in a position where it closes said jet aperture, and means for communicating pressurized fluid to the opposite end of said sleeve valve for applying a force greater than the force applied by said compressed air or gas operated means for opening the said jet aperture.

16. The source according to claim 15 wherein said communicating means comprises means for communicating the pressurized water in said chamber through a surface upon which said opposite end seats upon command for developing said greater force.

17. The source according to claim 15 wherein said communicating means comprises means for communicating pressurized air or gas through said seating surface at a pressure sufficient to develop said force greater than the force applied against said one end thereof.

18. A water gun seismic source for emitting jets of water in an underwater environment to generate seismic signals comprising a housing having a bore extending axially of said housing, a jet aperture in said housing extending transversely of the axis of said housing into said bore, a drive piston axially movable in opposite directions in an enlarged portion of said bore and dividing said enlarged portion of said bore into first and second chambers on opposite sides of said drive piston, said second chamber being a region in said housing for containing compressible fluid, said jet aperture extending into said first chamber, a sleeve valve around said bore in porting relationship with said jet aperture, means communicating water from the underwater environment into said first chamber while said jet aperture is closed, means for moving said piston into cocked position in one of said opposite directions to increase the volume of said first chamber and fill said first chamber with water, said water being under pressure greater than the pressure of said underwater environment when said piston is cocked, means for moving said sleeve valve to release said piston for movement in the other of said opposite directions to drive said water through said jet aperture and emit a jet of water to produce the seismic signal, said piston moving means comprising a section axially of said housing spaced from said first named bore and having another bore, a shaft on which said drive piston is fixedly mounted extending into the bore of said housing section, a cocking piston slideably mounted on said shaft and reciprocally moveable in said housing section bore, a collar on said shaft engageable by said cocking piston when it moves in said one direction to bring said drive piston into the cocked position, and said piston moving means being operated by compressed air or other gas and including means for returning said cocking piston in said opposite direction out of the way of said collar to relieve said drive piston and shaft of the mass of said cocking piston when said drive piston moves in said opposite direction to drive said water through said aperture and to emit said jet.

19. A water gun seismic source for emitting jets of water in an underwater environment to generate seismic signals comprising a housing having a bore extending axially of said housing, a jet aperture in said housing extending transversely of the axis of said housing into said bore, a drive piston axially movable in opposite directions in an enlarged portion of said bore and dividing said enlarged portion of said bore into first and second chambers on opposite sides of said drive piston, said second chamber being a region in said housing for containing compressible fluid, said jet aperture extending into said first chamber, a sleeve valve around said bore in porting relationship with said jet aperture, means communicating water from the underwater environment into said first chamber while said jet aperture is closed, means for moving said piston into cocked position in one of said opposite directions to increase the volume of said first chamber and fill said first chamber with water, said water being under pressure greater than the pressure of said underwater environment when said piston is cocked, means for moving said sleeve valve to release said piston for movement in the other of said opposite directions to drive said water through said jet aperture and emit a jet of water to produce the seismic signals, said housing having a bore in which said drive piston is reciprocally mounted, said bore defining said chamber and having a section of smaller diameter in which said jet aperture is disposed, said bore having a section of larger diameter spaced in the direction of said region from said section of smaller diameter and in which said piston is reciprocal, said bore section of smaller diameter defining a passage for higher velocity of flow of water through said jet aperture than the velocity of flow in said bore section of larger diameter when said jet aperture opens.

20. A water gun seismic source for emitting jets of water in an underwater environment to generate seismic signals comprising a housing having a bore extending axially of said housing, a jet aperture in said housing extending transversely of the axis of said housing into said bore, a drive piston axially movable in opposite directions in an enlarged portion of said bore and dividing said enlarged portion of said bore into first and second chambers on opposite sides of said drive piston, said second chamber being a region in said housing for containing compressible fluid, said jet aperture extending into said first chamber, a sleeve valve around said bore in porting relationship with said jet aperture, means communicating water from the underwater environment into said first chamber while said jet aperture is closed, means for moving said piston into cocked position in one of said opposite directions to increase the volume of said first chamber and fill said first chamber with water, said water being under pressure greater than the pressure of said underwater environment when said piston is cocked, means for moving said sleeve valve to release said piston for movement in the other of said opposite directions to drive said water through said jet aperture and emit a jet of water to produce the seismic signal, said means for moving said drive piston comprising a shaft connected to and reciprocal with said drive piston, a cocking piston mounted on said shaft and defining variable volume chambers on opposite sides of said cocking piston, and valve means for controlling the flow of pressururized fluid with respect to at least one of said variable volume chambers in said region for clocking said drive piston.

21. The source according to claim 20 wherein said shaft has a fixedly mounted collar thereon, said cocking piston being slideably mounted on said shaft between said collar and said drive piston and engageable with said collar, said valve means being operable to firstly switch in one sense the flow of said fluid with respect to said variable volume chambers for applying pressure on said cocking piston for moving said cocking piston into engagement with said collar and moving said shaft and drive piston in the direction of said region into cocked position, and secondly switching the flow of said fluid with respect to said variable volume chambers in the sense opposite to said first sense to move said cocking piston away from said collar and enable said drive piston to move independently of said cocking piston, relieved of the mass of said cocking piston, when said jet aperture porting valve is opened to emit said jet.

22. The source according to claim 21 wherein said housing has a compartment spaced from said chamber and said region into which said shaft extends and in which said cocking piston is reciprocal, said cocking piston dividing said compartment into said variable volume chambers, said collar and said drive piston being mounted adjacent opposite ends of said shaft, and said collar also being disposed on said shaft in said one of said variable volume chambers.

23. The source according to claim 22 wherein said fluid which is switched with respect to said variable volume regions is air or another compressible gas.

24. The source according to claim 23 wherein said valve means is a four-way valve having a spool movable in a bore, said bore having a cavity in communication with said compartment, said shaft having an extension movable into and out of sealing relationship with said cavity of said spool bore, inlets for said fluid at relatively high and relatively low pressure into said spool bore and outlet ports from said spool bore communicating with said variable volume chambers, means for biasing said spool in one direction toward said cavity, the high pressure one of said inlets being in communication with said cavity for developing pressure against said spool when said shaft extension is in sealing relationship with said cavity to move said spool in a direction opposite to said one direction to switch the outlet ports of said four-way valve with respect to said inlets for moving said cocking piston with said shaft and said drive piston into cocked position and then returning said cocking piston the high pressure one of said connections being in communication with said cavity for developing pressure against said spool when said sealing relationship exists to move said spool in a direction opposite to said one direction to switch the outlet ports of said four-way valve with respect to said inlets for moving said cocking piston to said rest position, and, when said sealing relationship does not exist, to move said spool in said one direction to switch the outlet ports of said four-way valve with respect to said connections for moving said cocking piston with said shaft and said drive piston into a cocked position.

25. The source according to claim 24 further comprising a relief valve communicating the one of said variable volume chambers of said compartment which is in communication with said spool and cavity with the one of said inlets at relatively low pressure.

26. The source according to claim 20 wherein said shaft has a passage therethrough communicating with said region, an inlet for air or another compressible gas at relatively high pressure into one of said variable volume chambers, an inlet for said air or other gas at relatively low pressure into the other of said chambers, and a valve element engageable with said shaft for communicating said high pressure inlet and said passage for charging said region with said air or other compressible gas at said high pressure, said valve being actuated by said shaft when it is in its retracted position.

27. In a water gun seismic source for emitting jets of water into an underwater environment to generate seismic signals and having a housing with a jet aperture having at least one jet aperture port and means for driving on command a jet of water through said jet aperture into said environment. The improvement comprising means defining a nozzle adjacent to said jet aperture port and extending toward said jet of water, and means for emitting compressed air or another gas through said nozzle into said jet of water.

28. The invention according to claim 27, said port being an opening with a periphery, and further comprising a passage in said housing communicating with the periphery of said port which provides said nozzle.

* * * * *